United States Patent [19]

Kuschel

[11] 4,074,154

[45] Feb. 14, 1978

[54] ELECTROMAGNETIC VIBRATOR WITH IMPROVED SPRING MOUNTS

[75] Inventor: Konrad Kuschel, Vienna, Austria

[73] Assignee: IFE Gesellschaft mbH, Vienna, Austria

[21] Appl. No.: 690,570

[22] Filed: May 27, 1976

[51] Int. Cl.² .......................................... H02K 33/02
[52] U.S. Cl. .................................................. 310/29
[58] Field of Search ................................ 310/15–17, 310/20–23, 27–32; 198/220 DC

[56] References Cited

U.S. PATENT DOCUMENTS

| | | | |
|---|---|---|---|
| 1,948,452 | 2/1934 | Young | 310/29 |
| 3,155,853 | 11/1964 | Spurlin et al. | 310/29 |
| 3,170,078 | 2/1965 | Kuschel | 310/29 |
| 3,522,460 | 8/1970 | Spurlin | 310/29 |
| 3,529,188 | 9/1970 | Gearing | 310/29 X |
| 3,931,534 | 1/1976 | Gray et al. | 310/29 |

Primary Examiner—Mark O. Budd

Attorney, Agent, or Firm—Michael J. Striker

[57] ABSTRACT

An electromagnetic drive has a first vibratory member which includes an armature and a second vibratory member which includes electromagnets arranged for cooperation with the armature. Leaf-type springs are arranged to couple the vibratory members, and clamping means provided at the ends of the springs rigidly press the individual leaves of the springs together. First connecting means connects the first vibratory member with the springs and second connecting means connects the second vibratory member with the springs via the clamping means. One or both of the second connecting means and the second vibratory member are arranged to compensate for the changes in spacing between the ends of the springs which occur in response to deflection of the springs. The second connecting means and the clamping means are arranged for substantially moment-free transmission of forces from the spring means to the second vibratory member.

26 Claims, 4 Drawing Figures

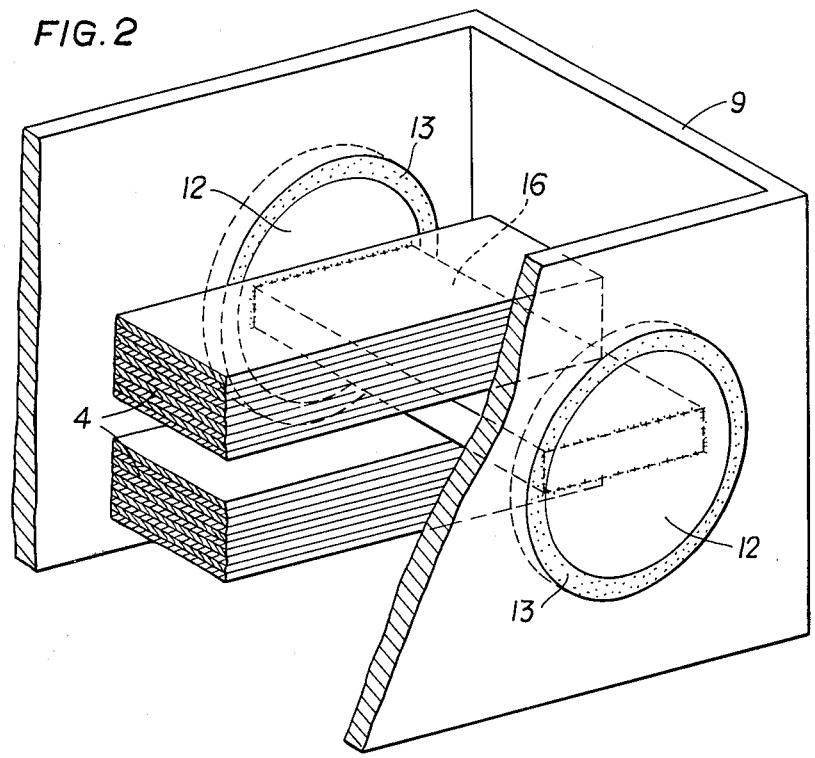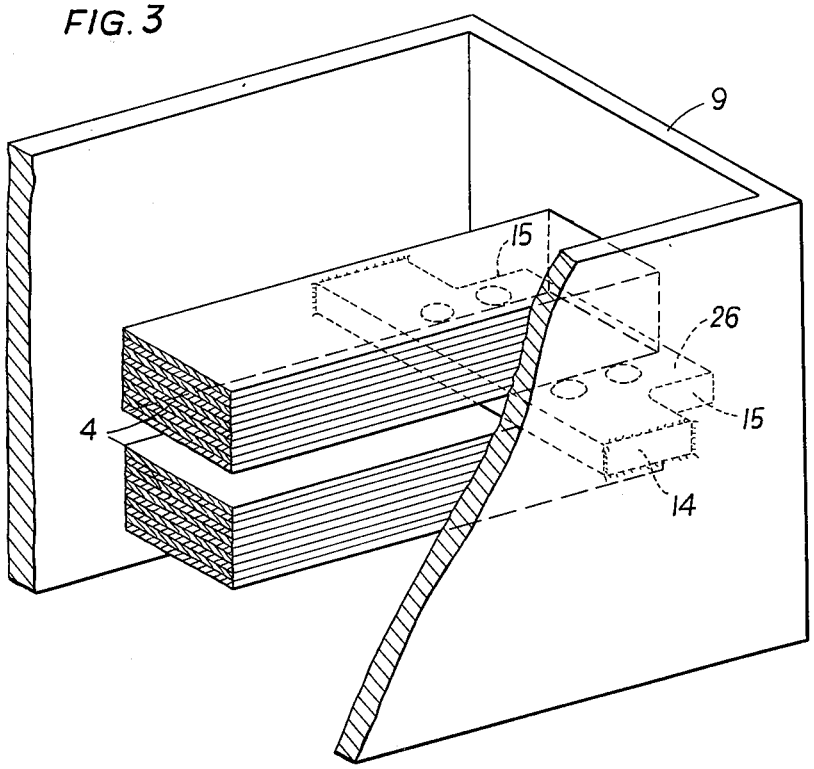

ELECTROMAGNETIC VIBRATOR WITH IMPROVED SPRING MOUNTS

BACKGROUND OF THE INVENTION

The invention relates generally to electromagnetic drives.

Of particular interest to the invention are electromagnetic drives of the type having two vibratory masses which are coupled with one another via at least one leaf-type spring. One of the vibratory masses includes the armature of the drive whereas the other vibratory mass includes an electromagnet. Advantageously, the latter vibratory mass also includes a housing which surrounds the leaf-type spring. The individual leaves of the spring are separated from one another via suitable spacers and clamping devices are provided for rigidly pressing the individual leaves of the spring together. The vibratory mass which includes the armature is connected with the center of the leaf-type spring whereas the vibratory mass which includes the electromagnet is connected with the clamping devices via suitable connecting elements. The connecting elements and/or the vibratory mass which includes the electromagnet compensate for or absorb the predominant part or the entire change in spacing between the ends of the leaf-type spring which occurs due to the deflection of the spring.

In the known drives, the connecting elements are fixed against rotation and transmit the moments of force generated at the ends of the leaf-type spring to the vibratory mass connected with the ends of the spring. Since the connecting elements are also constructed so as to compensate for or absorb the changes in distance between the ends of the spring, they exhibit a certain amount of resilience with respect to the moments of force. This leads to the result that the moment patterns and force patterns in the individual plate-like springs of the group of springs changes. Concomitantly, the spring constant of the spring system are affected.

SUMMARY OF THE INVENTION

One object of the invention is to provide a novel electromagnetic drive.

Another object of the invention is to provide a system of strip-like springs, or a leaf-type spring system where the two connecting means between the spring system and a second vibratory member are arranged for a substantially moment-free transmission of forces.

These objects, as well as others which will become apparent, are achieved in accordance with the invention. One aspect of the invention provides an electromagnetic drive comprising a first vibratory member which includes an armature and a second vibratory member which includes at least one electromagnet arranged for cooperation with the armature. Spring means, e.g., strip-like springs or a leaf-type spring, having spaced ends is arranged to couple the first and second vibratory members. First connecting means connects the first vibratory member with the spring means. Second connecting means, e.g., rod-like, bar-like or plate-like members, connects the second vibratory member with the spring means. The second connecting means and/or the second vibratory member is arranged to compensate for or absorb all or the predominant part of the changes in spacing between the ends of the spring means which occur in response to deflection of the spring means. The second connecting means is arranged for substantially moment-free transmission of forces from the spring means to the second vibratory member.

According to one embodiment of the invention, the spring means includes a plurality of spring members and clamping means is provided for pressing the spring members together. Here, the second vibratory member is connected with the spring means via the clamping means and the clamping means is also arranged for substantially moment-free transmission of forces from the spring means to the second vibratory member.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a partly perspective and partly sectional view illustrating another embodiment of the invention;

FIG. 3 is similar to FIG. 2 but shows still another embodiment of the invention.

DESCRIPTION OF THE PREFERRED EMBODIMENTS

Figure 1:
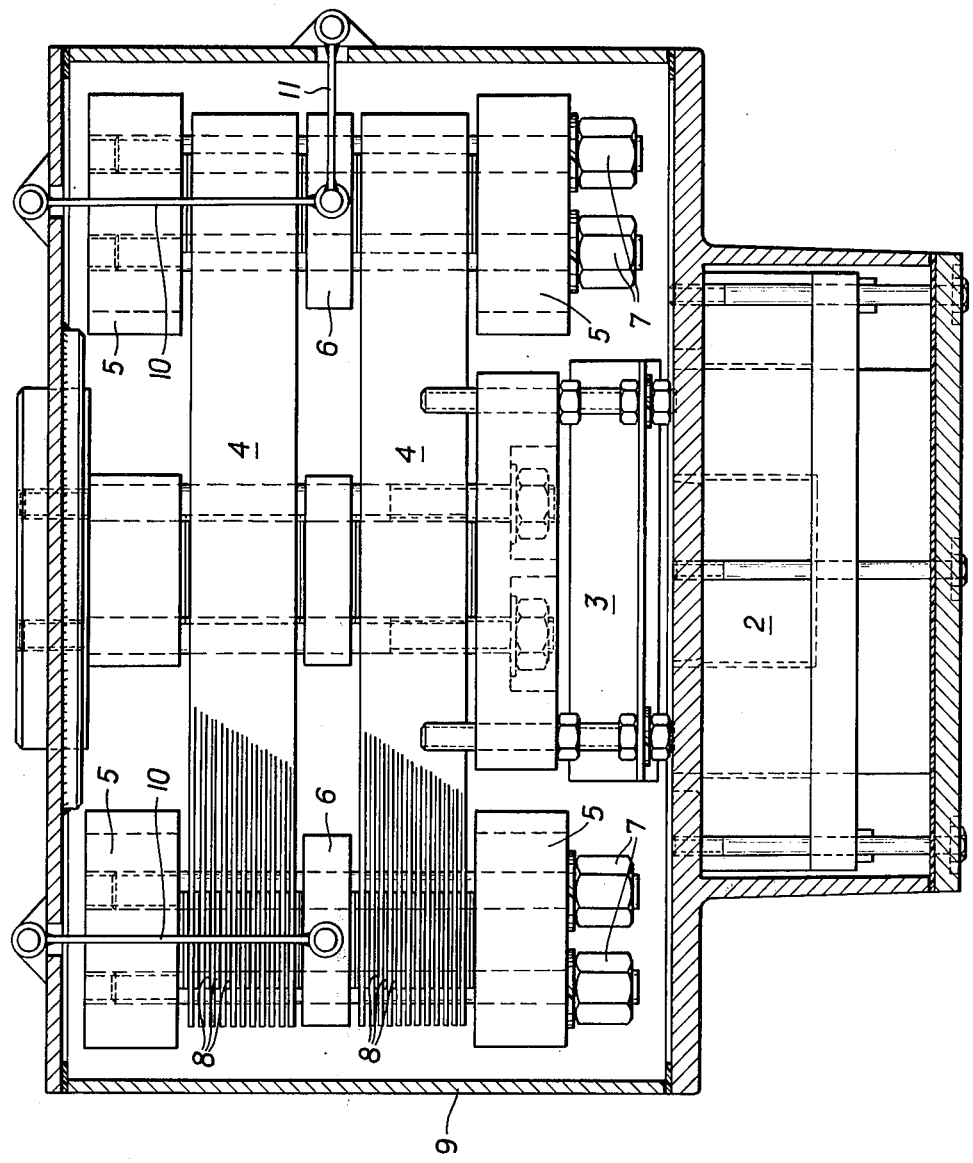
FIG. 1 is a longitudinal section through one form of electromagnetic drive in accordance with the inention.

In a preferred aspect, the invention relates to an electromagnetic drive of the type having two vibratory masses which are coupled with one another via at least one leaf-type spring, that is, via plate-like or strip-like springs. One of the vibratory masses includes the armature of the drive. The other vibratory mass includes an electromagnet of the drive and advantageously also includes a housing which surrounds the leaf-type spring. The individual leaves of the spring are preferably separated from one another via suitable spacers and clamping devices are provided for pressing the individual leaves of the spring together. It is favorable for the clamping devices to rigidly press the individual leaves of the spring together. The vibratory mass which includes the armature is preferably connected with the region of the center of the leaf-type spring whereas the vibratory mass which includes the electromagnet is preferably connected with the clamping devices. The vibratory mass which includes the electromagnet and/or the connecting elements which connect this vibratory mass with the clamping devices compensate for or absorb all or the predominant part of the changes in distance between the ends of the leaf-type spring which occur due to deflection of the spring.

An important concept of the invention resides in constructing the system of plate-like or strip-like springs in such a manner that the moments of force of the spring system which are generated at the ends of the strip-like springs are taken up or absorbed by the spring system itself. In accordance with the invention, this is achieved in that the clamping devices which are provided at the ends of the strip-like springs, as well as the connecting elements connecting these clamping devices with the vibratory mass which includes the electromagnet, are arranged for substantially moment-free transmission of forces to the vibratory mass which includes the electromagnets. With the inventive concept, neither a significant tractive stress occurs in the spring leaves nor is a fixed end moment transmitted through the connecting elements.

The pressure exerted at the ends of the springs should be sufficient to take up the moments of force which are generated as well as the forces which arise in longitudinal direction of the strip-like springs in reaction to the moments. In order to achieve a rigid stressing of the ends of the springs, a shifting of the spring ends relative to one another should be reliably avoided. Under such circumstances, the ends of the springs remain practically parallel to one another so that no moments need be conveyed by the spring system to the vibratory mass containing the electromagnet via the connecting elements connecting this vibratory mass with the spring system.

The connecting elements which connect the vibratory mass containing the electromagnet with the clamping devices for the spring ends are preferably constructed so as to have a relatively low resistance to torsion. As a result, the connection between this vibratory mass and the spring ends may be constructed exclusively from the viewpoint of absorbing the changes in spacing between the ends of the springs which occur during deflection of the springs. It is, however, also possible here to proceed along entirely new lines which are likewise encompassed within the scope of the invention.

It has been found advantageous to arrange the strip-like springs in two groups or packets which are maintained spaced from one another by spacing members provided at the spring ends and at the centers of the springs. It is possible here for the vibratory mass which includes the electromagnet to be connected with the spacing members provided at the spring ends. It is particularly favorable for the cross-sectional areas of the two groups to be at least approximately equal and for the number of springs in each group to be at least approximately the same.

Referring now to FIG. 1 of the drawing, this illustrates an electromagnetic drive which includes an electromagnet 2 arranged opposite an armature 3. The armature 3 is connected with the centers of two groups or packets 4 of strip-like springs via suitable threaded fastening elements.

Spacer elements 8 are provided intermediate the individual springs of the groups 4. In addition, spacing members 6 are arranged between the two spring groups 4. The ends of the spring groups 4 are firmly pressed together by means of plates 5 and threaded fasteners 7.

The electromagnetic drive is provided with a housing 9 which accommodates the spring groups 4 and supports the electromagnet 2. The ends of the spring groups 4 are connected with the housing 9 and the connection is achieved by means of rods 10 which are pivotally joined to the spacing members 6 on the one hand and the housing 9 on the other hand. The rods 10 extend in the direction of vibratory amplitude, that is, in the direction along which the main vibrations occur.

Rods 11 are provided in order to obtain lateral stability. The rods 11 are pivotally connected with the housing 9 and also with one of the spacing members 6. The rods 11 extend in longitudinal direction of the springs of the groups 4.

The moments arising during vibration are limited to the two spring groups 4. Thus, by virtue of the arrangement including the rods 10 and 11, the housing 9 is coupled with the ends of the spring groups 4 in a manner which permits a substantially moment-free transmission of forces from the spring groups 4 to the housing 9.

FIG. 2 shows another embodiment of the invention and the same reference numerals as in FIG. 1 have been used to identify like elements. The difference between the embodiment of FIG. 2 and that of FIG. 1 resides primarily in the manner in which the connection between the housing 9 and the ends of the spring groups 4 is achieved.

In the embodiment of FIG. 2, the elements connecting the ends of the spring groups 4 with the housing 9 are in the form of bar-like or plate-like members 16 which here simultaneously serve as spacing members for spacing the spring groups 4 from one another. Discs 12 are welded to the lateral ends of the bar-like members 16 and the discs 12 fit in openings provided in the housing 9. The openings in the housing 9 are of such a size that annular clearance spaces are formed between the openings and the discs 12. The clearance spaces are filled with an elastic substance such as, for instance, rubber, which is applied to the peripheral surfaces of the discs 12 and to the surfaces bounding the openings in the housing 9 and then vulcanized. The resulting rubber rings or annuli are identified by the reference numeral 13.

It is possible to utilize rubber blocks instead of the rubber annuli 13. Such rubber blocks may be formed directly about the bar-like members 16 and inserted in square or rectangular openings provided in the housing 9.

FIG. 3 illustrates an embodiment of the invention which is particularly well-suited for those cases where small vibrational amplitudes are involved. In FIG. 3, the same reference numerals as in the preceding FIGURES have been used to identify like elements.

When the amplitudes of vibration are small, the elasticity of the housing 9 may be adequate to follow the changes in spacing between the ends of the springs of the groups 4 which occur during vibration. It is sufficient, in such an event, for the connection between the ends of the spring groups 4 and the housing 9 to be effected as illustrated in FIG. 3, that is, it is sufficient to use bar-like or plate-like members 26 having lateral faces 14 which are welded to the longitudinal walls of the housing 9. It may be seen that, similarly to the bar-like members 16 of FIG. 2, the bar-like members 26 serve as spacing members for spacing the spring groups 4 from one another.

The bar-like members 26 are provided with shoulders 15 as a result of which the area of the lateral faces 14 of the bar-like members 26 is smaller than the cross-sectional area of the bar-like members 26. This leads to the result that the bar-like members 26 are resistant to bending in longitudinal direction of the springs of the groups 4 but have a relatively low resistance to torsion about an axis which extends perpendicular to the longitudinal direction of the springs of the groups 4 and to the direction of vibratory amplitude, that is, the direction along which the main vibrations occur. Thus, essentially only tensile and compressive forces are conveyed into the housing 9.

In order to take up or absorb such forces, the bar-like members 26 of FIG. 3, or the bar-like members 16 of FIG. 2, may be connected with one another via rods which extend in longitudinal direction of the springs of the groups 4. These rods, which have not been illustrated here for the sake of clarity, may be arranged next to the spring groups 4 or between the spring groups 4.

It is further possible to connect the longitudinally extending rods with the housing 9. In such an event, the bar-like members 16 and 26 may be connected with the housing 9 via the longitudinally extending rods.

Figure 4:
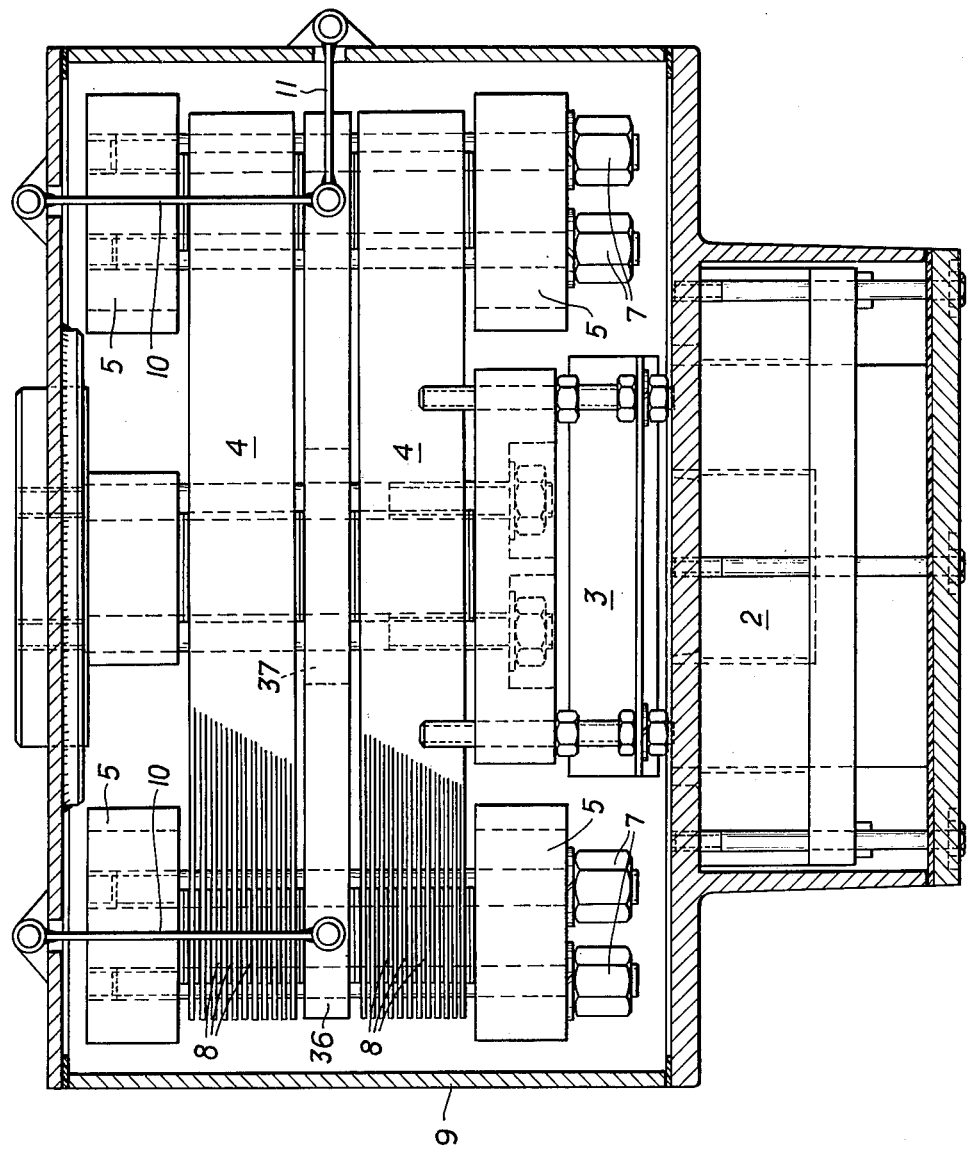
FIG. 4 is similar to FIG. 1 and illustrates an additional embodiment of the invention.

FIG. 4 illustrates an embodiment of the invention wherein a plate 36 is arranged between the spring groups 4 instead of the spacing members 6 of FIG. 1. In FIG. 4, the same reference numerals as in the preceding FIGURES have been used to identify like elements.

In the embodiment of FIG. 4, the end portions of the plate 36 constitute spacing elements for spacing the spring groups 4 from one another. The plate 36 is provided with an opening 37 at its center. The purpose of the opening 37 is to permit the connecting elements which connect the armature 3 with the spring groups 4 to extend through the plate 36. It will be seen that the armature 3, which is a vibratory mass like the electromagnet 2, is here connected with the center regions of the spring groups 4.

The invention is not limited to the exemplary embodiments illustrated in the drawings. The spacing between the spring groups 4 may be selected so as to be larger than shown. The connection between the housing 9 and the ends of the spring groups 4 need not originate at the spacing members but may originate at a stressing member 5. The bar-like members 26 may also be welded with the housing 9 via the side faces thereof which project beyond the spring groups 4 in longitudinal direction of the springs. It is likewise possible for the bar-like members 26 to extend through the lateral walls of the housing 9.

In such an event, the bar-like members 26 may be provided with flanges exteriorly of the housing 9 which bear against the external surfaces of the lateral walls of the housing 9 via elastic blocks.

The element designated by the term housing in the preceding description represents essentially the primary mass of the vibratory member which includes the electromagnet 2. Instead of the housing 9, it is possible to use a frame work or the like. According to what has been stated, the vibratory member which is connected with the ends of the spring groups 4 is thus constituted by a main portion, e.g., framework or housing and the connecting elements such as bars, rods and the like, and, under appropriate circumstances, by additional masses. Where high frequencies and small amplitudes of vibration are involved, the elasticity of the wall of the housing 9 is in most cases sufficient to take up or compensate for the changes in distance between the ends of the springs of the groups 4 which occur during deflection of the springs. Where large amplitudes of vibration are involved, it is advantageous to interpose an elastic element between the spring groups 4 and the wall of the housing 9.

The invention may also be used with advantage for the known devices having strip-like springs of synthetic plastic. In this manner, the disadvantages of the known spring-containing drives, as regards their vibrational characteristics, may be eliminated at least to a large extent.

It will be understood that each of the elements described above, or two or more together, may also find a useful application in other types of constructions differing from the types described above.

While the invention has been illustrated and described as embodied in an electromagnetic drive, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An electromagnetic drive, comprising a first vibratory member which includes an armature; a second vibratory member which includes at least one electromagnet arranged for cooperation with said armature; spring means having spaced end portions and arranged to couple said first and second vibratory members; first connecting means connecting said first vibratory member with said spring means; and second connecting means connecting said second vibratory member with said spring means, at least one of said second connecting means and said second vibratory member being arranged to compensate for at least the predominant part of the changes in spacing between said end portion which occur in response to deflection of said spring means, and said second connecting means being arranged for substantially moment-free transmission of forces from said spring means to said second vibratory member, said second connecting means comprising bar-like members provided in the regions of said end portions, said bar-like members being resistant to bending in longitudinal direction of said spring means and in the direction of vibration of said spring means, and said bar-like members having a low resistance to torsion about an axis extending normal to the vibrational plane.

2. An electromagnetic drive, comprising a first vibratory member which includes an armature; a second vibratory member which includes at least one electromagnet arranged for cooperation with said armature; spring means having spaced end portions and arranged to couple said first and second vibratory members; first connecting means connecting said first vibratory member with said spring means; and second connecting means connecting said second vibratory member with said spring means, at least one of said second connecting means and said second vibratory member being arranged to compensate for at least the predominant part of the changes in spacing between said end portions which occur in response to deflection of said spring means, and said second connecting means being arranged for substantially moment-free transmission of forces from said spring means to said second vibratory member, said second connecting means comprising pivotally mounted rod-like members.

3. An electromagnetic drive, comprising a first vibratory member which includes an armature; a second vibratory member which includes at least one electromagnet arranged for cooperation with said armature; spring means having spaced end portions and arranged to couple said first and second vibratory members, said spring means comprising two spaced groups, each of which includes a plurality of said spring members, the cross-sectional areas of said groups being at least approximately equal and the number of spring members in each of said groups being at least approximately the same; first connecting means connecting said first vibratory member with said spring means; and second connecting means connecting said second vibratory member with said spring means, at least one of said second connecting means and said second vibratory member being arranged to compensate for at least the predominant part of the changes in spacing between said end portions which occur in response to deflection of said spring means, and said second connecting means being arranged for substantially moment-free transmission of forces from said spring means to said second vibratory member, said second connecting means comprising bar-like members and said bar-like members constitute spacing members for spacing said groups from one another.

4. An electromagnetic drive, comprising a first vibratory member which includes an armature; a second vibratory member which includes at least one electromagnet arranged for cooperation with said armature; spring means having spaced end portions and arranged to couple said first and second vibratory members, said spring means comprising two spaced groups each of which includes a plurality of said spring members, the cross-sectional areas of said groups being at least approximately equal and the number of spring members in each of said groups being at least approximately the same; first connecting means connecting said first vibratory member with said spring means; second connecting means connecting said second vibratory member with said spring means, at least one of said second connecting means and said second vibratory member being arranged to compensate for at least the predominant part of the changes in spacing between said end portions which occur in response to deflection of said spring means, and said second connecting means being arranged for substantially moment-free transmission of forces from said spring means to said second vibratory member; a support; and an elongated rod extending in longitudinal direction of said spring means arranged on either side of said groups, said second connecting means including bar-like members and said bar-like members being mounted on said support via said rods.

5. A drive as defined in claim 4, wherein said support comprises a housing for said spring means.

6. An electromagnetic drive, comprising a first vibratory member which includes an armature; a second vibratory member which includes at least one electromagnet arranged for cooperation with said armature; spring means having spaced end portions and arranged to couple said first and second vibratory members, said spring means comprising two spaced groups each of which includes a plurality of said spring members the cross-sectional areas of said groups being at least approximately equal and the number of spring members in each of said groups being at least approximately the same; first connecting means connecting said first vibratory member with said spring means; second connecting means connecting said second vibratory member with said spring means, at least one of said second connecting means and said second vibratory member being arranged to compensate for at least the predominant part of the changes in spacing between said end portions which occur in response to deflection of said spring means, and said second connecting means being arranged for substantially moment-free transmission of forces from said spring means to said second vibratory member; a support; and elongated rods extending in longitudinal direction of said spring means arranged between said groups, said groups being spaced by a plurality of spacing members and said spacing members being mounted on said support via said rods.

7. A drive as defined in claim 6, wherein said support comprises a housing for said spring means.

8. An electromagnetic drive, comprising a first vibratory member which includes an armature; a second vibratory member which includes at least one electromagnet arranged for cooperation with said armature; spring means comprising a plurality of spring leaves having spaced end portions and arranged to couple said first and second vibratory members; first connecting means connecting said first vibratory member with said spring means; second connecting means connecting said second vibratory member with said spring means for substantially moment-free transmission of forces from said spring means to said second vibratory member and for substantially preventing tractive stress from acting upon each of said spring leaves and for also preventing transmission of a fixed end moment from said spring leaves to said second vibratory member, said second connecting means comprising clamping means connected to the end portions of said spring leaves for rigidly pressing said spring leaves together and being arranged to compensate for at least the predominant part of the changes in spacing between said end portions due to response to deflection of said spring means.

9. A drive as defined in claim 8, said second vibratory member including at least one or a plurality of electromagnets, and said spring leaves being of plate-like configuration; and wherein spacers are provided between said spring members and said clamping means rigidly presses said spring leaves together, said first connecting means connecting said first vibratory member with approximately the center of said spring means, and said clamping means including a clamping arrangement at each of said end portions.

10. A drive as defined in claim 8, wherein said second vibratory member comprises a housing for said spring means.

11. A drive as defined in claim 10, said second connecting means comprising bar-like members; and wherein said bar-like members are mounted on said housing via masses of material having a greater elasticity than the material of said housing and the material of said bar-like members.

12. A drive as defined in claim 11, wherein said masses are of substantially annular configuration.

13. A drive as defined in claim 11, wherein said masses are of block-like configuration.

14. A drive as defined in claim 8, wherein said second connecting means comprises rod-like members.

15. A drive as defined in claim 8, said spring means comprising two spaced groups each of which includes a plurality of said spring leaves; and wherein the cross-sectional areas of said groups are at least approximately equal and the number of spring members in each of said groups is at least approximately the same.

16. A drive as defined in claim 15, wherein said groups are spaced from one another by at least one spacing member.

17. A drive as defined in claim 16, wherein a spacing member is provided in the region of each of said end portions.

18. A drive as defined in claim 17, wherein said second vibratory member is connected with both of said spacing members.

19. A drive as defined in claim 16, said two spacing members being the end sections of a plate, spacing said groups from one another, which is provided with an opening in the center region thereof, and said first connecting means comprises connecting elements extending through said opening to that vibratory mass connected with the spring center.

20. A drive as defined in claim 8, wherein said second connecting means comprises rod-like members, each of which extends in the direction of vibratory amplitude, and wherein said rod-like members connect both said spring means and said clamping means to said second vibratory member.

21. A drive as defined in claim 20, wherein said clamping means prevents substantial tractive stress of each spring leaf by successively attenuating reaction moments which incidentally arise from longitudinal stress acting on said spring leaves by increasingly dissipating the reaction moment in directions towards the center of said spring leaves in such a manner that a center spring leaf has neither a tractive nor a compressive strain along its length following longitudinal stress acting on at least one of said spring leaves.

22. A drive as defined in claim 21, wherein said rod-like members are constructed so as to be without substantial resistance to torsion.

23. A drive as defined in claim 21, wherein said rod-like members are constructed so as to have substantially no resistance to torsion.

24. A drive as defined in claim 8, said second connecting means further comprising rod-like connectors having a length which is oriented perpendicularly with respect to the length of said clamping means.

25. A drive as defined in claim 8, said second connecting means further comprising means providing a substantially resistance-free approach of the ends of said spring leaves towards and away from said second vibratory member with substantially no resistance to the approach.

26. A drive as defined in claim 8 further comprising spacer means connected to the spaced ends of said spring leaves for separating said spring leaves in such a manner as to form two physically separated groups of spring leaves, wherein each of said plurality of spring leaves has spaced end portions, wherein said clamping means comprises two pairs of clamps, each pair being located above and below the groups of spring leaves, being connected to the spaced ends of one side of said spring leaves and pressing the groups of springs towards each other, and wherein said second connecting means comprises two rod connectors each being connected to a respective end of said spacer means, extending in a direction approximately perpendicular to the length of said spring leaves, extending through one of said clamps and being connected to said second vibratory member while spacing said one clamp from said second vibratory member.

* * * * *